(12) United States Patent
Takahashi

(10) Patent No.: US 10,577,460 B2
(45) Date of Patent: Mar. 3, 2020

(54) METHOD FOR PRODUCING POLYESTER

(71) Applicant: NIPPON SODA CO., LTD., Tokyo (JP)

(72) Inventor: Eiji Takahashi, Ichihara (JP)

(73) Assignee: NIPPON SODA CO., LTD., Tokyo (JP)

(*) Notice: Subject to any disclaimer, the term of this patent is extended or adjusted under 35 U.S.C. 154(b) by 140 days.

(21) Appl. No.: 15/543,932

(22) PCT Filed: Jan. 15, 2016

(86) PCT No.: PCT/JP2016/051156
§ 371 (c)(1),
(2) Date: Jul. 14, 2017

(87) PCT Pub. No.: WO2016/117473
PCT Pub. Date: Jul. 28, 2016

(65) Prior Publication Data
US 2018/0022867 A1    Jan. 25, 2018

(30) Foreign Application Priority Data

Jan. 19, 2015   (JP) .................................. 2015-008009

(51) Int. Cl.
*C08G 63/82* (2006.01)
*C08G 63/08* (2006.01)
*C08G 63/83* (2006.01)
*C08G 63/84* (2006.01)
*C08G 63/87* (2006.01)

(52) U.S. Cl.
CPC ........... *C08G 63/823* (2013.01); *C08G 63/08* (2013.01); *C08G 63/83* (2013.01); *C08G 63/84* (2013.01); *C08G 63/87* (2013.01)

(58) Field of Classification Search
CPC ...... C08G 63/08; C08G 63/823; C08G 63/83; C08G 63/84; C08G 63/87
See application file for complete search history.

(56) References Cited

U.S. PATENT DOCUMENTS 3,477,998 A    11/1969  Nakahara et al.
4,080,491 A *  3/1978   Kobayashi ............. C08G 61/08
                                                   526/113

2011/0313127 A1    12/2011  Iwasa et al.
2013/0209392 A1 *   8/2013  Arhancet ............. C07D 319/12
                                                      424/78.38
2015/0361214 A1    12/2015  Nemoto et al.
2016/0060454 A1 *   3/2016  Arhancet ............... A23K 20/10
                                                      424/78.37

FOREIGN PATENT DOCUMENTS

| CN | 103342800 A | 10/2013 |
| JP | H08-193127 A | 7/1996 |
| JP | H11-255870 A | 9/1999 |
| JP | 2008-069271 A | 3/2008 |
| JP | 2010-185003 A | 8/2010 |
| JP | 2011-111461 A | 6/2011 |

OTHER PUBLICATIONS

Hans R. Kricheldorf et al "Polylactones: 32. High-molecular-weight polylactides by ring-opening polymerization with dibutylmagnesium or butylmagnesium chloride", Polymer vol. 36 No. 15, pp. 2995-3003, 1995 (Year: 1995).*
Odile Dechy-Cabaret et al "Controlled Ring-Opening Polymerization of Lactide and Glycolide", Chem. Rev. 2004, 104, 6147-6176 (Year: 2004).*
Mar. 8, 2016 International Search Report issued in International Patent Application No. PCT/JP2016/051156.
Aug. 10, 2018 Extended Search Report issued in European Patent Application No. 16740080.3.

* cited by examiner

*Primary Examiner* — Ling Siu Choi
*Assistant Examiner* — Gennadiy Mesh
(74) *Attorney, Agent, or Firm* — Oliff PLC

(57) ABSTRACT

A cyclic ester, for example 3,6-bis[2-(methylthio)ethyl]-1,4-dioxane-2,5-dione, is mixed, in an organic solvent, with an alkyl aluminum compound represented by a formula [I]: $R_n Al X_{3-n}$, for example trimethyl aluminum, triethyl aluminum, tri-isobutyl aluminum, tri-n-hexyl aluminum, tri-n-butyl aluminum, tri-n-octyl aluminum, diethyl aluminum chloride, ethyl aluminum sesquichloride, ethyl aluminum dichloride, or diisobutyl aluminum hydride. The resulting mixture is then mixed with at least one ring-opening polymerization catalyst selected from the group consisting of a dialkyl zinc and a dialkyl magnesium to allow ring-opening polymerization of the cyclic ester, thereby obtaining a polyester.

5 Claims, No Drawings

METHOD FOR PRODUCING POLYESTER

TECHNICAL FIELD

The present invention relates to a method for producing polyester. More specifically, the present invention relates to a method for producing polyester by ring-opening polymerization of cyclic ester.

BACKGROUND ART

Polyester includes a product, aliphatic polyester such as polylactones, polylactides, lactone-lactide copolymers and the like, obtained by chemical synthesis and biopolyester such as polyhydroxycarboxylic acid and the like produced by microorganisms. The biopolyester and the aliphatic polyester are known as biodegradable plastics.

The polylactones, the polylactides, or the lactone-lactide copolymers can be produced by a direct polycondensation reaction of hydroxycarboxylic acid, by a ring-opening polymerization reaction of lactones or lactides, or by a bacterial biosynthetic reaction.

Allegedly, a synthesis method for polylactones, polylactides, lactone-lactide copolymers or the like by the ring-opening polymerization reaction can easily give a polyester having higher molecular weight and can be higher in a degree of freedom of molecular design in comparison with other synthesis methods.

Various proposals have been made on a ring-opening polymerization method of cyclic ester such as polylactones, polylactides and the like. For example, Patent Literature 1 discloses a method for producing polylactic acid, comprising a ring-opening polymerization of lactide using an alkyl aluminum compound such as triethyl aluminum as a ring-opening polymerization catalyst. Patent Literature 2 discloses a method for producing polylactic acid, comprising adding a condensation product made from aluminum isopropoxide, silicon tetrachloride and tributyl phosphate into a solution containing L-lactide and triethyl aluminum to allow a ring-opening polymerization reaction.

CITATION LIST

Patent Literatures

Patent Literature 1: WO 2010/087422 A
Patent Literature 2: JP H08-193127 A

SUMMARY OF THE INVENTION

Problems to be Solved by the Invention

A ring-opening polymerization reaction in the presence of a hydroxycarboxylic acid being a raw material for a cyclic ester can hardly produce a polyester having a higher molecular weight. Therefore, water or hydroxycarboxylic acid that can react with lactides to cause ring-opening is required to be removed from the reaction system as much as possible. For removing water or hydroxycarboxylic acid from a reaction raw material, a method by adsorption, distillation, recrystallization, or the like is generally known, but installation of facilities for carrying out the methods is required. Moreover, complete elimination of water therefrom without decomposition of lactides is difficult.

The object of the present invention is to provide a method for stably producing a polyester by ring-opening polymerization of cyclic ester with a simple inactivation of water or hydroxycarboxylic acid in such a manner that the polymerization is not influenced even without particularly installing the facilities for dewatering.

Means for Solving the Problems

Zealous works for solving the problems described above have resulted in completing the present invention including the embodiments described below.

[1] A method for producing polyester, the method comprising:
mixing, in an organic solvent, a cyclic ester with an alkyl aluminum compound represented by a formula [I]; and then mixing the resulting mixture with at least one ring-opening polymerization catalyst selected from the group consisting of an organic lithium ring-opening polymerization catalyst, an organic sodium ring-opening polymerization catalyst, an organic potassium ring-opening polymerization catalyst, an organic zinc ring-opening polymerization catalyst, an organic magnesium ring-opening polymerization catalyst, an organic tin ring-opening polymerization catalyst, an organic calcium ring-opening polymerization catalyst, an organic titanium ring-opening polymerization catalyst, and an amine ring-opening polymerization catalyst to allow ring-opening polymerization of the cyclic ester.

$$R_nAlX_{3-n} \quad [I]$$

In the formula [I], n represents an integer from 1 to 3, R each independently represents a linear or branched C1-20 alkyl group, and X each independently represents a halogen atom or a hydrogen atom

[2] The method for producing polyester according to [1], wherein a temperature in the mixing the cyclic ester with the alkyl aluminum compound is not more than 70° C.

[3] The method for producing polyester according to [1] or [2], wherein the alkyl aluminum compound is at least one selected from the group consisting of trimethyl aluminum, triethyl aluminum, tri-isobutyl aluminum, tri-n-hexyl aluminum, tri-n-butyl aluminum, tri-n-octyl aluminum, diethyl aluminum chloride, ethyl aluminum sesquichloride, ethyl aluminum dichloride, and diisobutyl aluminum hydride.

[4] The method for producing polyester according to any one of [1] to [3], wherein the cyclic ester is lactides.

[5] The method for producing polyester according to any one of [1] to [3], wherein the cyclic ester is a compound having 1,4-dioxane-2,5-dione structure.

[6] The method for producing polyester according to any one of [1] to [3], wherein the cyclic ester is represented by a formula [III].

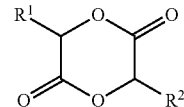

In the formula [III], $R^1$ and $R^2$ each independently represent a hydrogen atom, a linear or branched C1-20 alkyl group, a linear or branched C1-20 haloalkyl group, a linear or branched C2-20 alkenyl group, a linear or branched C2-20 alkynyl group, a C4-6 cycloalkyl group, a linear or branched C1-20 alkylcarbonyl group, a linear or branched C1-20 alkoxycarbonyl group, a linear or branched C1-20 haloalkylcarbonyl group, a linear or branched C2-20 alkenylcarbonyl group, a linear or branched C2-20 alkynylcarbonyl group, C4-6 cycloalkylcarbonyl group, 2-(methylthio)ethyl group, 2-(methylsulfinyl)ethyl group, 2-(methylsulfonyl)ethyl group, benzyl group, or phenyl group.

[7] The method for producing polyester according to any one of [1] to [6], wherein the ring-opening polymerization catalyst is at least one selected from the group consisting of an organic lithium ring-opening polymerization catalyst, an organic sodium ring-opening polymerization catalyst, an organic potassium ring-opening polymerization catalyst, dialkyl zinc, bis(2,2,6,6-tetramethylpiperidinyl) zinc, alkyl zinc halide, substituted alkyl zinc halide, cycloalkyl zinc halide, aryl zinc halide, 2-norbornyl zinc bromide, dialkyl magnesium, organic magnesium halide, tin alkoxide, and an amine ring-opening polymerization catalyst.

[8] The method for producing polyester according to any one of [1] to [6], wherein the ring-opening polymerization catalyst is at least one selected from the group consisting of dialkyl zinc, dialkyl magnesium, and an amine ring-opening polymerization catalyst.

[9] The method for producing polyester according to any one of [1] to [8], wherein the amount of the alkyl aluminum compound is 0.5 mol to 5 mol based on 1 mol of the cyclic ester.

[10] The method for producing polyester according to any one of [1] to [9], wherein the amount of the ring-opening polymerization catalyst is 0.01 mol to 10 mol based on 1 mol of the cyclic ester.

Advantageous Effects of the Invention

According to the method of the present invention, polyester can be produced by stably allowing ring-opening polymerization of cyclic ester even without particularly installing facilities for eliminating impurities in the cyclic ester, the impurities affecting the polymerization. In the present invention, dewatering of a reaction raw material such as the cyclic ester and the like by a publicly known method such as adsorption, distillation and recrystallization can further stably allow the ring-opening polymerization to produce the polyester.

Although the details have not been known yet, the reason why such effects are produced is assumed that an alkyl aluminum compound reacts with water or hydroxycarboxylic acid which may be contained in an organic solvent containing the cyclic ester in several cases to inactivate water or hydroxycarboxylic acid which inhibits the ring-opening polymerization reaction.

EMBODIMENTS FOR CARRYING OUT THE INVENTION

A method for producing polyester according to the present invention, the method comprises mixing a cyclic ester and an alkyl aluminum compound in an organic solvent, and then mixing the resultant mixture and a ring-opening polymerization catalyst to allow ring-opening polymerization of the cyclic ester.

The cyclic ester used in the present invention is a compound, having an ester bond, as shown in a formula [IIa]. The cyclic ester represented by the formula [IIa] is a compound having one ester bond, but the cyclic ester used in the present invention may be a compound having two or more ester bonds. The cyclic ester can be used alone or in combination of two or more. Moreover, the cyclic ester is preferably subjected to dewatering treatment by a publicly known method such as adsorption, distillation and the like.

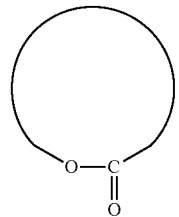

[IIa]

The cyclic ester used in the present invention may have any substituent group as long as the substituent group does not adversely affect a ring-opening polymerization reaction. Specific examples of the substituent group can include a linear or branched C1-20 alkyl group, a linear or branched C1-20 haloalkyl group, a linear or branched C2-20 alkenyl group, a linear or branched C2-20 alkynyl group, a C4-6 cycloalkyl group, a linear or branched C1-20 alkyl carbonyl group, a linear or branched C1-20 alkoxy carbonyl group, a linear or branched C1-20 haloalkyl carbonyl group, a linear or branched C2-20 alkenyl carbonyl group, a linear or branched C2-20 alkynyl carbonyl group, a C4-6 cycloalkyl carbonyl group, 2-(methylthio)ethyl group, 2-(methylsulfinyl)ethyl group, 2-(methylsulfonyl)ethyl group, benzyl group and phenyl group.

Specific examples of the cyclic ester can include lactones such as β-propiolactone, β-butyrolactone, γ-butyrolactone, δ-valerolactone, ε-caprolactone, α,α-dimethyl-β-propiolactone, β-methyl-δ-valerolactone, β-ethyl-δ-valerolactone, α-methyl-ε-caprolactone, β-methyl-ε-caprolactone, γ-methyl-ε-caprolactone, 3,3,5-trimethyl-ε-caprolactone, ω-pentadecalactone and the like; and lactides such as glycolide, dilactide, 3,6-diethyl-1,4-dioxane-2,5-dione, 1,4-dioxepane-2,5-dione, 1,5-dioxocane-2,6-dione, 1,5-dioxonane-2,6-dione, 1,6-dioxecane-2,7-dione, 3, 6-bis(2-(methylthio)ethyl)-1,4-dioxane-2,5-dione and the like.

The cyclic ester preferably used in the present invention is lactides. The lactides each are a compound having two ester bonds as shown in a formula [IIb]

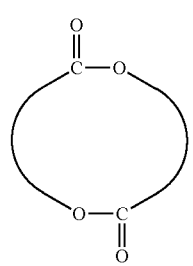

[IIb]

Among the lactides used in the present invention, a compound having 1,4-dioxane-2,5-dione structure is preferable, and a compound represented by a formula [III] is further preferable.

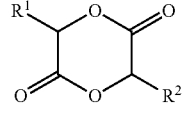

[III]

In the formula [III], $R^1$ and $R^2$ each independently represent a hydrogen atom, a linear or branched C1-20 alkyl group, a linear or branched C1-20 haloalkyl group, a linear or branched C2-20 alkenyl group, a linear or branched C2-20 alkynyl group, a C4-6 cycloalkyl group, a linear or branched C1-20 alkyl carbonyl group, a linear or branched C1-20 alkoxy carbonyl group, a linear or branched C1-20 haloalkyl carbonyl group, a linear or branched C2-20 alkenyl carbonyl group, a linear or branched C2-20 alkynyl carbonyl group, a C4-6 cycloalkyl carbonyl group, 2-(methylthio) ethyl group, 2-(methylsulfinyl)ethyl group, 2-(methylsulfonyl)ethyl group, benzyl group and phenyl group.

In the compound represented by the formula [III], $R^1$ is preferably the same as $R^2$. The cyclic ester most preferably used in the present invention is dilactide or 3,6-bis(2-(methylthio)ethyl)-1,4-dioxane-2,5-dione.

The cyclic ester may have an asymmetric carbon atom. Thus, the cyclic ester used in the present invention can be any one of isomers or a mixture consisting of at least two isomers. More specifically, the compound represented by the formula [III] has two asymmetric carbon atoms. Thus, the compound represented by the formula [III] can be of a (R, R) form, a (S, S) form, and a (R, S) form or a mixture consisting of at least two of isomers thereof.

The cyclic ester used in the present invention may be a commercially available product or may be synthesized by a publicly known method. The lactones can be obtained by intramolecular dehydration condensation of hydroxycarboxylic acid. The lactides can be obtained by depolymerizing an oligomer obtained by the intermolecular dehydration condensation of hydroxycarboxylic acid.

The compound having 1,4-dioxane-2,5-dione structure can be obtained by depolymerizing an oligomer obtained by intermolecular dehydration condensation of α-hydroxycarboxylic acid. Specific examples of the α-hydroxycarboxylic acid can include glycolic acid, L-lactic acid, D-lactic acid, α-hydroxybutyric acid, α-hydroxyisobutyric acid, α-hydroxyvaleric acid, α-hydroxycaproic acid, α-hydroxyisocaproic acid, α-hydroxyheptanoic acid, α-hydroxyoctanoic acid, α-hydroxydecanoic acid, α-hydroxymyristic acid, α-hydroxystearic acid, 2-hydroxy-4-(methylthio)butanoic acid, 2-hydroxy-4-(methylsulfinyl)butanoic acid, 2-hydroxy-4-(methylsulfonyl)butanoic acid and the like.

The alkyl aluminum compound used in the present invention is a compound having a structure in which an alkyl group is bonded to aluminum. The alkyl aluminum compound used in the present invention is preferably a compound represented by a formula [I]. In the present invention, the alkyl aluminum compound may be used alone or in combination of two or more.

$$R_nAl\ X_{3-n} \quad [I]$$

In the formula [I], R each independently represents a linear or branched C1-20 alkyl group, and X each independently represents a halogen atom or a hydrogen atom. In the formula [I], n represents an integer from 1 to 3. In the present invention, an alkyl aluminum compound in which n in the formula [I] is 3 is preferably used.

Specific examples of the alkyl aluminum compound used in the present invention can include trimethyl aluminum, triethyl aluminum, triisobutyl aluminum, tri-n-hexyl aluminum, tri-n-butyl aluminum, tri-n-octyl aluminum, diethyl aluminum chloride, ethyl aluminum sesquichloride, ethyl aluminum dichloride, diisobutyl aluminum hydride and the like.

The organic solvent used in the present invention is not particularly limited as long as the organic solvent does not adversely affect the ring-opening polymerization reaction. Specific examples of the organic solvent can include an ether solvent such as dioxane, 1,2-dimethoxyethane, tetrahydrofuran, cyclopentyl methyl ether, ethylene glycol dimethyl ether and the like; an aromatic hydrocarbon solvent such as toluene, benzene, xylene and the like; an aliphatic hydrocarbon solvent such as n-pentane, n-hexane, n-heptane and the like; a halogenated hydrocarbon solvent such as dichloromethane, chloroform, carbon tetrachloride, 1,2-dichloroethane and the like; an amide solvent such as N,N-dimethylformamide, N,N-dimethylacetamide, N-methylpyrrolidon and the like; a nitrile solvent such as acetonitrile, benzonitrile and the like; and an ester solvent such as ethyl acetate, isopropyl acetate, butyl acetate and the like. The organic solvent may be used alone or in combination of two or more.

Among these solvents, an ether solvent, an aromatic hydrocarbon solvent or an aliphatic hydrocarbon solvent is preferable, an ether solvent or an aromatic hydrocarbon solvent is further preferable, and cyclopentyl methyl ether or toluene is still further preferable. The organic solvent is preferably subjected to dewatering treatment by a publicly known method such as adsorption, distillation and the like.

The ring-opening polymerization catalyst used in the present invention is at least one selected from the group consisting of an organic lithium ring-opening polymerization catalyst, an organic sodium ring-opening polymerization catalyst, an organic potassium ring-opening polymerization catalyst, an organic zinc ring-opening polymerization catalyst, an organic magnesium ring-opening polymerization catalyst, an organic tin ring-opening polymerization catalyst, an organic calcium ring-opening polymerization catalyst, an organic titanium ring-opening polymerization catalyst, and an amine ring-opening polymerization catalyst; is preferably at least one selected from the group consisting of an organic lithium ring-opening polymerization catalyst, an organic sodium ring-opening polymerization catalyst, an organic potassium ring-opening polymerization catalyst, dialkyl zinc, bis(2,2,6,6-tetramethylpiperidinyl) zinc, alkyl zinc halide, substituted alkyl zinc halide, cycloalkyl zinc halide, aryl zinc halide, 2-norbornyl zinc bromide, dialkyl magnesium, organic magnesium halide, tin alkoxide, and an amine ring-opening polymerization catalyst; is further preferably at least one selected from the group consisting of dialkyl zinc, dialkyl magnesium, and an amine ring-opening polymerization catalyst. In the present invention, the ring-opening polymerization catalyst may be used alone or in combination of two or more.

Specific examples of the organic lithium ring-opening polymerization catalyst can include alkyl lithium such as methyl lithium, ethyl lithium, isopropyl lithium, isobutyl lithium, n-butyl lithium, sec-butyl lithium, tert-butyl lithium, n-hexyl lithium, 2-ethylhexyl lithium and the like; aryl lithium such as phenyl lithium and the like; lithium amide such as lithium bis(trimethylsilyl)amide, lithium diisopropylamide and the like; lithium alkoxide such as lithium ethoxide, lithium t-butoxide and the like; (trimethylsilyl)methyl lithium; 2-methoxycarbonylisopropyl lithium and the like.

Specific examples of the organic sodium ring-opening polymerization catalyst can include sodium amide such as sodium bis(trimethylsilyl)amide and the like; and sodium alkoxide such as sodium ethoxide, sodium t-butoxide and the like.

Specific examples of the organic potassium ring-opening polymerization catalyst can include potassium amide such as potassium bis(trimethylsilyl)amide and the like; and potassium alkoxide such as potassium ethoxide, potassium t-butoxide and the like.

Specific examples of the organic zinc ring-opening polymerization catalyst include dialkyl zinc such as dimethyl zinc, diethyl zinc, diisopropyl zinc, dicyclopentyl zinc, dicyclohexyl zinc and the like; bis(2,2,6,6-tetramethylpiperidinyl) zinc; alkyl zinc halide such as methyl zinc chloride, 2-propyl zinc bromide, n-propyl zinc bromide, n-butyl zinc bromide, isobutyl zinc bromide, sec-butyl zinc bromide, tert-butyl zinc bromide, 1,1-dimethylpropyl zinc bromide, 1-ethylpropyl zinc bromide, 1-methylbutyl zinc bromide, 3-methylbutyl zinc bromide, n-pentyl zinc bromide, 1-ethylbutyl zinc bromide, 2-ethylbutyl zinc bromide, n-hexyl zinc bromide, 1-ethylpentyl zinc bromide, 1-methylhexyl zinc bromide, 1-propylbutyl zinc bromide, n-heptyl zinc bromide, 2-ethylhexyl zinc bromide and the like; substituted alkyl zinc halide such as 3-cyanopropyl zinc bromide, 2-cyanoethyl zinc bromide, (1,3-dioxolan-2-yl)methyl zinc bromide, 4-chlorobutyl zinc bromide, 4-cyanobutyl zinc bromide, 3-methoxy-2-methyl-3-oxopropyl zinc bromide, 2-(1,3-dioxolan-2-yl)ethyl zinc bromide, 3-ethoxy-3-oxopropyl zinc bromide, 5-chloropentyl zinc bromide, 4-acetoxybutyl zinc bromide, 4-ethoxy-4-oxobutyl zinc bromide, 4-pentenyl zinc bromide, 5-hexenyl zinc bromide, 6-chlorohexyl zinc bromide, 6-cyanohexyl zinc bromide, (cyclohexylmethyl) zinc bromide, 5-acetoxypentyl zinc bromide, 5-ethoxy-5-oxopentyl zinc bromide, benzyl zinc bromide, phenethyl zinc bromide, α-methylbenzyl zinc bromide, 6-acetoxyhexyl zinc bromide, 6-ethoxy-6-oxohexyl zinc bromide, (2-naphthylmethyl)zinc bromide and the like; cycloalkyl zinc halide such as cyclopropyl zinc bromide, cyclobutyl zinc bromide, cyclopentyl zinc bromide, cyclohexyl zinc bromide and the like; aryl zinc halide such as phenyl zinc bromide and the like; 2-norbornyl zinc bromide; zinc lactate and the like.

Specific examples of the organic magnesium ring-opening catalyst can include dialkyl magnesium such as diethyl magnesium, di-n-butyl magnesium and the like; magnesium alkoxide such as magnesium diethoxide, magnesium di-tert-butoxide and the like; and organic magnesium halide such as methyl magnesium bromide, methyl magnesium chloride, methyl magnesium iodide, ethynyl magnesium bromide, ethynyl magnesium chloride, vinyl magnesium bromide, vinyl magnesium chloride, ethyl magnesium bromide, ethyl magnesium chloride, 1-propynyl magnesium bromide, allyl magnesium bromide, allyl magnesium chloride, cyclopropyl magnesium bromide, isopropenyl magnesium bromide, isopropyl magnesium bromide, isopropyl magnesium chloride, n-propyl magnesium chloride, 2-thienyl magnesium bromide, 3-thienyl magnesium bromide, 1-methyl-1-propenyl magnesium bromide, 2-methyl-1-propenyl magnesium bromide, 2-methylallyl magnesium bromide, 2-methylallyl magnesium chloride, 3-butenyl magnesium bromide, (1,3-dioxolan-2-ylmethyl)magnesium bromide, 1-methyl-2-propenyl magnesium chloride, 2-butenyl magnesium chloride, isobutyl magnesium bromide, isobutyl magnesium chloride, n-butyl magnesium chloride, sec-butyl magnesium chloride, tert-butyl magnesium chloride, trimethylsilylmethyl magnesium chloride, 4-pentenyl magnesium bromide, cyclopentyl magnesium bromide, cyclopentyl magnesium chloride, 2-pentyl magnesium bromide, 3-pentyl magnesium bromide, isopentyl magnesium bromide, n-pentyl magnesium bromide, n-pentyl magnesium chloride, pentamethylene bis (magnesium bromide), 1,1-dimethylpropyl magnesium chloride, 2,2-dimethylpropyl magnesium chloride, 2,2-dimethylpropyl magnesium chloride, 2-methylbutyl magnesium chloride, (1,3-dioxane-2-ylethyl)magnesium bromide, cyclohexyl magnesium chloride, n-hexyl magnesium bromide, n-hexyl magnesium chloride, 2-ethylbutyl magnesium chloride, benzyl magnesium chloride, (cyclohexylmethyl) magnesium bromide, n-heptyl magnesium bromide, cycloheptyl magnesium bromide, phenethyl magnesium chloride, (2-ethylhexyl) magnesium bromide, n-octyl magnesium bromide, n-octyl magnesium chloride, n-nonyl magnesium bromide, 2-methyl-2-phenylpropyl magnesium chloride, 3,7-dimethyloctyl magnesium bromide, n-decyl magnesium bromide, (2-naphthylmethyl)magnesium bromide, n-dodecyl magnesium bromide, n-tetradecyl magnesium chloride, n-pentadecyl magnesium bromide, n-octadecyl magnesium chloride, phenyl magnesium bromide, phenyl magnesium chloride and the like.

Specific examples of the organic tin ring-opening polymerization catalyst can include tin alkoxide such as dimethoxy tin, diethoxy tin, tert-butoxy tin, diisopropoxy tin and the like; and tin(II) 2-ethylhexanoate and the like.

Specific examples of the organic calcium ring-opening polymerization catalyst can include calcium alkoxide such as calcium dimethoxide, calcium diethoxide, calcium diisopropoxide and the like.

Specific examples of the organic titanium ring-opening polymerization catalyst can include alkoxy titanium such as tetramethoxy titanium, tetrapropoxy titanium, tetraisopropoxy titanium, tetrabutoxy titanium, tetraisobutoxy titanium and the like; titanium cyclohexide, titanium phenoxide and the like.

Specific examples of the amine ring-opening polymerization catalyst can include 1,5,7-triazabicyclo[4.4.0]-5-dodecene, N-methyl-1,5,7-triazabicyclo[4.4.0]-5-dodecene, 1,8-diazabicyclo[5.4.0]-7-undecene, 4-dimethylaminopyridine and the like.

In the method for producing polyester according to the present invention, the cyclic ester and the alkyl aluminum compound are first mixed in the organic solvent. A mixing order of the cyclic ester, the alkyl aluminum compound, and the organic solvent is not particularly limited. For example, the cyclic ester may be added to the organic solvent and then the alkyl aluminum compound may be added thereto, the alkyl aluminum compound may be added to the organic solvent and then the cyclic ester may be added thereto, or the cyclic ester and the alkyl aluminum compound may be added to the organic solvent substantially simultaneously.

In the present invention, a temperature upon mixing the cyclic ester and the alkyl aluminum compound is not particularly limited, but is preferably 75° C. or lower, and further preferably 70° C. or lower. A lower limit of the temperature upon mixing the cyclic ester and the alkyl aluminum compound is not particularly limited as long as the mixture to be obtained is in a liquid state at the temperature.

An amount of the alkyl aluminum compound to be mixed therewith is not particularly limited, but is preferably 0.5 mol to 5 mol, and further preferably 1 mol to 3 mol, based on 1 mol of the cyclic ester.

In the method for producing polyester according to the present invention, the ring-opening polymerization catalyst is subsequently mixed with the mixture obtained in the previous step.

In the present invention, the ring-opening polymerization catalyst and the mixture are mixed preferably after elapse of 15 minutes to 10 hours, and further preferably after elapse of 30 minutes to 3 hours, from the time at which mixing of the cyclic ester and the alkyl aluminum compound is completed.

An amount of the ring-opening polymerization catalyst that can be mixed therewith is not particularly limited, but is preferably 0.01 to 10 mol, and further preferably 0.1 to 5 mol, based on 1 mol of the cyclic ester.

The mixing of the ring-opening polymerization catalyst and the mixture can allow ring-opening polymerization of the cyclic ester. A temperature during the ring-opening polymerization is not particularly limited, but is preferably adjusted according to activation level of the ring-opening polymerization catalyst. The temperature during the ring-opening polymerization is, for instance, preferably not less than ordinary temperature and not more than a reflux temperature, further preferably not less than ordinary temperature and not more than 100° C., and still further preferably not less than ordinary temperature and not more than 70° C.

After completion of the ring-opening polymerization, the polyester being a reaction product can be purified by a publicly known method. The purification method is not particularly limited. For example, a solution of the reaction product may be washed with an aqueous alkali solution of sodium hydroxide, potassium hydroxide or the like, an aqueous acid solution of hydrochloric acid, nitric acid, phosphoric acid or the like, or water, and then may be separated by stationary separation, centrifugation or the like. Moreover, specific examples thereof can include a method in which a solution of the reaction product is brought into contact with a poor solvent to precipitate the reaction product, a method in which a solution of the reaction product is dispersed into warm water to distill off a solvent therefrom, and a method in which a solution of the reaction product is passed through an adsorption column or the like.

The polyester in the solution after purification can be removed therefrom by causing precipitation with the poor solvent such as water, alcohol or the like, and then evaporating the solvent from the precipitate by means such as warm water, hot air, reduced pressure or the like. Moreover, the polyester can be removed from the solution after purification by eliminating the solvent from the solution using a thin film dryer, a reduced pressure dryer, a vented extruder, or the like. The polyester in the solution after purification can also be removed as a solid by causing precipitation with the poor solvent such as water, alcohol or the like, and then treating slurry of the precipitate by a centrifugal separator, a filter, or the like.

The polyester removed from the solution can be subjected to drying process at a temperature of not more than a decomposition temperature of the polyester. A drying rate can be improved by reducing pressure during the drying process. The drying process can be usually applied thereto until a remaining solvent is reduced to preferably 1000 ppm or less, further preferably 300 ppm or less, and still further preferably 100 ppm or less.

The production method of the present invention can produce a homopolyester made from one cyclic ester or a copolyester made from two or more cyclic esters on demand.

The production method of the present invention can produce a polyester having a high molecular weight, for instance, a polyester having a weight average molecular weight of preferably 1000 to 1,000,000.

Moreover, the production method of the present invention can produce a polyester having a narrow molecular weight distribution to a broad molecular weight distribution. According to the production method of the present invention, for example, polyester having a ratio of weight average molecular weight to number average molecular weight (Mw/Mn) of preferably 1.01 to 3.00, and further preferably 1.01 to 2.50 can be obtained.

In addition, the weight average molecular weight and the number average molecular weight are expressed in terms of values obtained by determining standard polystyrene equivalent molecular weight from measurement results by GPC using tetrahydrofuran as an eluent.

The polyester obtained by the present invention can be utilized as a biodegradable polymer. The polyester obtained by the present invention can be processed, by a publicly known method, into fibers, a spun yarn, a nonwoven fabric, a capsule, a container, a pipe, a tube, a film, a sheet, or the like. The polyester obtained by the present invention can be used as a drug sustained release system material, a medical material, an agricultural material, a fishery material, a general purpose resin substitute, a coating material, a coating agent, an adhesive, a binder, or the like.

Hereinafter, the present invention will be described more specifically with reference to Examples. In addition, the present invention is not limited by Examples described below, and can be obviously practiced by appropriately making modifications within the range in which such modifications are compatible with the spirit of the present invention, and all of these are encompassed within the technical scope of the present invention.

In the present Examples, the weight average molecular weight (Mw) and the number average molecular weight (Mn) are expressed in terms of the values obtained by determining the standard polystyrene equivalent molecular weight from the measurement results by GPC using tetrahydrofuran as the eluent.

EXAMPLE 1

In a 200 mL recovery flask, 5.81 g (40.3 mmol) of dilactide and 27.83 g of toluene were put, and the resultant mixture was warmed to 50° C. To the mixture, 0.55 g of a solution of 1.0 M triethylaluminum in hexane (made by Sigma-Aldrich Co. LLC, specific gravity: 0.692) was added at 50° C., and the resultant mixture was stirred at 50° C. for 80 minutes. The solution was analyzed. A polymer detectable by GPC was not formed therein.

To the solution, 0.20 g of a solution of 1.0 M dibutylmagnesium in heptane (made by Sigma-Aldrich Co. LLC, specific gravity: 0.713) was added at 50° C., and the resultant mixture was stirred at 50° C. for 5 hours. Then, the mixture was allowed to cool to room temperature. The resultant solution was analyzed. Polyester having a weight average molecular weight (Mw) of 24,400 and a molecular weight distribution (Mw/Mn) of 1.74 was detected therein.

EXAMPLE 2

In a 200 mL recovery flask, 5.95 g (41.3 mmol) of dilactide and 38.9 g of cyclopentyl methyl ether were put, and the resultant mixture was warmed to 60° C. To the mixture, 0.34 g of a solution of 1.0 M triethylaluminum in hexane (made by Sigma-Aldrich Co. LLC, specific gravity: 0.692) was added at 60° C., and the resultant mixture was stirred at 60° C. for 30 minutes. The solution was analyzed. A polymer detectable by GPC was not formed therein.

To the solution, 0.27 g of a solution of 1.0 M diethylzinc in hexane (made by Sigma-Aldrich Co. LLC, specific gravity: 0.726) was added at 60° C., and the resultant mixture was stirred at 60° C. for 30 hours. Then, the mixture was allowed to cool to room temperature. The resultant solution was analyzed. Polyester having a weight average molecular weight (Mw) of 27,100 and a molecular weight distribution (Mw/Mn) of 2.50 was detected therein.

EXAMPLE 3

In a 200 mL recovery flask, 5.82 g (40.4 mmol) of dilactide, 25.46 g of toluene and 15.12 g of tetrahydrofuran were put, and the resultant mixture was warmed to 60° C. In the solution, 0.55 g of a solution of 1.0 M triethylaluminum in hexane (made by Sigma-Aldrich Co. LLC, specific gravity: 0.692) was added at 60° C., and the resultant mixture was stirred at 60° C. for 30 minutes. The solution was analyzed. A polymer detectable by GPC was not formed therein.

To the mixture, 0.56 g of a solution of 0.517 parts by mass of 1,5,7-triazabicyclo[4.4.0]-5-dodecene in 9.61 parts by mass of tetrahydrofuran were added at 60° C., and the resultant mixture was stirred at 60° C. for 8 hours. Then, the mixture was allowed to cool to room temperature. The resultant solution was analyzed. Polyester having a weight average molecular weight (Mw) of 13,800 and a molecular weight distribution (Mw/Mn) of 1.54 was detected therein.

COMPARATIVE EXAMPLE 1

In a 200 mL recovery flask, 10.71 g (40.5 mmol) of 3,6-bis(2-(methylthio)ethyl)-1,4-dioxane-2,5-dione and 49.96 g of toluene were put, and the resultant mixture was warmed to 50° C. To the mixture, 0.11 g of a solution of 1.0 M dibutylmagnesium in heptane (made by Sigma-Aldrich Co. LLC, specific gravity: 0.713) was added at 50° C., and the resultant mixture was stirred at 50° C. for 8 hours. Then, the mixture was allowed to cool to room temperature. The resultant solution was analyzed. A polymer detectable by GPC was not formed therein.

A solution composed of 10.71 g (40.5 mmol) of 3,6-bis (2-(methylthio)ethyl)-1,4-dioxane-2,5-dione and 49.96 g of toluene was prepared. A water content of this solution was 110 ppm. The reason is considered that, in Comparative Example 1, this water inactivates dibutylmagnesium to inhibit a polymerization reaction, and polyester was unable to be obtained.

EXAMPLE 4

In a 200 mL recovery flask, 10.70 g (40.5 mmol) of 3,6-bis(2-(methylthio)ethyl)-1,4-dioxane-2,5-dione and 50.02 g of toluene were put, and the resultant mixture was warmed to 50° C. To the mixture, 0.14 g of a solution of 1.0 M triethylaluminum in hexane (made by Sigma-Aldrich Co. LLC, specific gravity: 0.692) was added at 50° C., and the resultant mixture was stirred at 50° C. for 8 hours. The solution was analyzed. A polymer detectable by GPC was not formed therein.

To the solution, 0.11 g of a solution of 1.0 M dibutylmagnesium in heptane (made by Sigma-Aldrich Co. LLC, specific gravity: 0.713) was added at 50° C., and the resultant mixture was stirred at 50° C. for 8 hours. Then, the mixture was allowed to cool to room temperature. The resultant solution was analyzed. Polyester having a weight average molecular weight (Mw) of 46,300 and a molecular weight distribution (Mw/Mn) of 1.68 was detected therein.

A solution composed of 10.70 g (40.5 mmol) of 3,6-bis (2-(methylthio)ethyl)-1,4-dioxane-2,5-dione and 50.02 g of toluene was prepared. A water content of this solution was 110 ppm. The reason is considered that water which is considered to be contained in the solution is scavenged by triethylaluminum, and the polymerization reaction stably proceeds without being inhibited.

REFERENCE EXAMPLE 1

In a 200 mL recovery flask, 5.78 g (40.10 mmol) of dilactide and 25.73 g of toluene were put, and the resultant mixture was warmed to 70° C. To the mixture, 0.66 g of a solution of 1.0 M triethylaluminum in hexane (made by Sigma-Aldrich Co. LLC, specific gravity: 0.692) was added at 70° C., and the resultant mixture was stirred at 70° C. for 6 hours. The resultant solution was analyzed. A polymer detectable by GPC was not formed therein.

The invention claimed is:

1. A method for producing polyester, the method comprising:
mixing, in the presence of an organic solvent, a cyclic ester with an alkyl aluminum compound represented by a formula [I]:

wherein, in the formula [I], n represents an integer from 1 to 3, R each independently represents a linear or branched C1-20 alkyl group, and X each independently represents a halogen atom or a hydrogen atom; and
subsequently mixing the resulting mixture with a ring-opening polymerization catalyst to allow ring-opening polymerization of the cyclic ester,
wherein:
the ring-opening polymerization catalyst is at least one selected from the group consisting of a dialkyl zinc and a dialkyl magnesium, and
the cyclic ester is represented by a formula [III]:

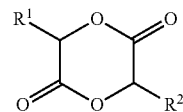

wherein, in the formula [III], $R^1$ and $R^2$ each represent a 2-(methylthio)ethyl group.

2. The method for producing polyester according to claim 1, wherein a temperature in the mixing the cyclic ester with the alkyl aluminum compound is not more than 70° C.

3. The method for producing polyester according to claim 1, wherein the alkyl aluminum compound is at least one selected from the group consisting of trimethyl aluminum, triethyl aluminum, tri-isobutyl aluminum, tri-n-hexyl aluminum, tri-n-butyl aluminum, tri-n-octyl aluminum, diethyl aluminum chloride, ethyl aluminum sesquichloride, ethyl aluminum dichloride, and diisobutyl aluminum hydride.

4. The method for producing polyester according to claim 1, wherein the amount of the alkyl aluminum compound is 0.5 mol to 5 mol based on 1 mol of the cyclic ester.

5. The method for producing polyester according to claim 1, wherein the amount of the ring-opening polymerization catalyst is 0.01 mol to 10 mol based on 1 mol of the cyclic ester.

* * * * *